United States Patent [19]

Kobayashi et al.

[11] 4,243,994
[45] Jan. 6, 1981

[54] LIQUID RECORDING MEDIUM

[75] Inventors: Hajime Kobayashi, Mitaka; Noboru Koumura, Narashino; Shigeru Ohno, Tokyo, all of Japan

[73] Assignee: Canon Kabushiki Kaisha, Tokyo, Japan

[21] Appl. No.: 16,985

[22] Filed: Mar. 2, 1979

[30] Foreign Application Priority Data

Mar. 3, 1978 [JP] Japan .................................. 53-24627

[51] Int. Cl.³ ........................................... G01D 15/18
[52] U.S. Cl. .................................. 346/140 R; 430/117
[58] Field of Search ......................... 346/75, 1, 140 R; 430/106, 112, 114–119

[56] References Cited

U.S. PATENT DOCUMENTS

| 3,535,244 | 10/1970 | Zabiak | 430/119 X |
| 3,731,655 | 5/1973 | Griesser | 346/75 UX |
| 3,878,519 | 4/1975 | Eaton | 346/140 IJ X |
| 3,924,974 | 12/1975 | Fischbeck et al. | 346/75 X |
| 3,980,576 | 9/1976 | Vijayendran | 430/106 X |
| 4,023,180 | 5/1977 | Zenner | 346/75 |
| 4,126,565 | 11/1978 | Lenhard et al. | 430/106 X |
| 4,126,711 | 11/1978 | Marlow | 430/117 X |

FOREIGN PATENT DOCUMENTS

| 2452499 | 7/1975 | Fed. Rep. of Germany | 430/112 |
| 38-6396 | 7/1963 | Japan | 430/112 |
| 7408206 | 12/1974 | Netherlands | 430/114 |

Primary Examiner—George H. Miller, Jr.
Attorney, Agent, or Firm—Fitzpatrick, Cella, Harper & Saxon

[57] ABSTRACT

A liquid recording medium for recording by ejecting liquid droplets comprises (a) recording agent which is a component to form a recorded image; and (b) carrier liquid to dissolve or disperse said recording agent, a difference ΔT between a decomposition temperature of a substance having the lowest decomposition temperature among the substances constituting the recording agent and a boiling point of said liquid recording medium, exclusive of said recording agent, being at least 30° C.

11 Claims, 4 Drawing Figures

LIQUID RECORDING MEDIUM

BACKGROUND OF THE INVENTION a. Field of the Invention

This invention relates to liquid recording medium suitable for use in a recording method which performs image recording by ejecting the liquid recording medium from an orifice of a nozzle in the form of droplets and sputtering the same onto an image recording member. More particularly, the invention is concerned with such liquid recording medium having remarkably improved heat response, thermal efficiency, stability, continuous recording performance over a long period of time, and various other characteristics.

b. Description of Prior Arts

So-called non-impact recording methods have recently drawn public attention, because unconfortable noises during the recording operation could be reduced to a negligible order. Among these particularly important is the so-called ink jet recording method which allows high-speed recording on a plain paper without particular image-fixing treatment, and, in this particular field, there have been proposed various approaches including those already commercialized, and others still under development.

Such ink jet recording method, in which droplets of a liquid recording medium (usually called "ink") are impinged and deposited on an image recording member to achieve the recording, can be classified into several processes according to the method of generating the droplets, and also to the method of controlling the direction of impingement of the droplets.

The first process is disclosed, for example, in the U.S. Pat. No. 3,060,429 (Teletype process), in which the liquid droplets are generated by electrostatic pull, and the droplets thus generated on demand are deposited on an image recording member with or without an electric-field control on the sputtering direction.

More specifically, the electric-field control is achieved by applying an electric field between the liquid contained in a nozzle having an orifice and an accelerating electrode, thereby causing the liquid to be emitted from the orifice and to sputter between x-y deflecting electrodes which are so arranged as to controlling the electric field according to recording signals, and thus selectively controlling the sputtering direction of the droplets according to variations in strength of the electric field to attain ink deposition at desired positions.

The second process disclosed, for example, in the U.S. Pat. No. 3,596,275 (Sweet process) and U.S. Pat. No. 3,298,030 (Lewis and Brown process), in which flow of liquid droplets of controlled electrostatic charges is produced by continuous vibration and is sputtered between deflecting electrodes forming a uniform electric field therebetween to attain image recording on a recording member.

More specifically, in this second process, a charging electrode which receives recording signals is provided in front of, and at a certain distance from, an orifice of a nozzle constituting a part of a recording head equipped with a piezo vibrating element, and a pressurized liquid is supplied into the nozzle, while an electric signal of a determined frequency is applied to the piezo vibrating element to cause mechanical vibration thereof, thereby causing the orifice to emit a flow of liquid droplets. As the emitted liquid is charged by electrostatic induction by the above-mentioned charging electrode, each droplet has a charge corresponding to the recording signal. The droplets having such controlled charge are subjected to deflection corresponding to the amount of the charge during this sputtering in a uniform electric field between the deflecting electrodes in such a manner that only those droplets carrying the recording signals are deposited onto the recording member.

The third process is disclosed, for example, in the U.S. Pat. No. 3,416,153 (Hertz process), in which an electric field is applied between a nozzle and an annular charging electrode to generate a mist of liquid droplets by continuous vibration. In this process, strength of the electric field applied between the nozzle and charging electrode is modulated according to the recording signals to control atomization of liquid for gradation in the recorded image.

The fourth process disclosed, for example, in the U.S. Pat. No. 3,747,120 (Stemme process) is based on a principle fundamentally different from that used in the foregoing three processes.

In contrast to the abovementioned three processes, in which the image recording is achieved by electrically controlling the liquid droplets emitted from the nozzle during their sputtering, thus selectively depositing only those carrying the recording signals onto the recording member, the Stemme process is featured in generating and impinging the droplets only when they are required for recording.

More specifically, in this Stemme process, electric recording signals are applied to a piezo vibrating element provided in a recording head having a liquid-emitting orifice, and the recording signals are converted into mechanical vibration of the piezo element, by which vibrating the liquid droplets are emitted from the orifice and deposited onto a recording member.

The foregoing four processes, while they have their respective advantages, are accompanied by drawbacks which are inevitable or have to be prevented.

The foregoing first to third processes rely on electric energy for forming droplets or droplet flow of liquid recording medium, and also on an electric field for controlling deflection of the droplets. For this reason, the first process, though structurally simple, requires a high voltage for droplet formation and is not suitable for high-speed recording, since a multi-orificed recording head is difficult to make.

The second process, though being suitable for high-speed recording as the use of multi-orifice structure in the recording head is feasible, inevitably results in a structural complexity and is further accompanied by other drawbacks such as necessity for precise and difficult electric controls for governing the impinging direction of droplets, and tendency to result in formation of satellite dots on the recording member.

The third process, though advantageous in achieving recording of an improved gradation by atomization of the emitted droplets, has drawbacks of difficulty in controlling the state of atomization, presence of background fog in the recorded image and being unsuitable for high-speed recording because of difficulty in constructing a multi-orificed recording head.

In comparison with the foregoing three processes, the fourth process has relatively important advantages such as a simpler structure, absence of liquid recovery system, since the droplets are emitted on demand from the orifice of the nozzle in contrast to the foregoing three processes wherein the droplets having no contribution to the image recording have to be recovered, and a larger freedom in selecting the materials constituting the liquid recording medium not requiring electric conductivity in contrast to the first and second processes wherein the medium has to be conductive. On the other hand, the fourth process is again accompanied by drawbacks such as difficulty in obtaining a small head or a multi-orificed head, because the mechanical working of head is difficult and also because a small piezo vibrating element of a desired frequency is extremely difficult to obtain, and inadequacy for high-speed recording, because the emission and impingement of the liquid droplets have to be effected by the mechanical vibrating energy of the piezo element.

As explained in the foregoing, each of the conventional processes has its own advantages and drawbacks in connection with the structure, applicability to high-speed recording, fabrication of recording head, in particularly, multi-orificed one, formation of satellite dots, and formation of background fog. Therefore, their use has been limited to the fields, in which such advantages can only be exploited.

In addition to several characteristics suitable for manuscript and printing such as ordinary offset printing, the liquid recording medium which is generally called "ink-composition" and is utilized in the abovementioned kinds of recording method has been given other characteristics in accordance with the modes of recording as described above.

For instance, these kinds of recording method should be excellent in signal response and faithfulness in reproduction, since the recording operation is done by ejecting droplets of the liquid recording medium from an orifice of a nozzle. Further, these recording methods are required to have various other characteristics such that the liquid recording medium can flow through the nozzle at a speed in conformity to the recording speed, that fixation of the liquid recording medium onto an image recording member such as paper, etc. is quick upon recording, that satisfactory image density can be obtained in the recorded image, and that the liquid recording medium has long storage life, and various others. Furthermore, when electric or electrostatic method is adopted for the liquid ejecting method, or for controlling the sputtering direction of the droplets of the liquid recording medium, such electric or electrostatic characteristics are also taken into consideration to the abovementioned properties. In order therefore to satisfy such various characteristics, those properties such as viscosity, surface tension, resistivity, electrical capacitance, dielectric constant, etc. of the liquid recording medium are properly regulated to desired values.

Thus, while the conventional liquid recording medium has been given various characteristics, they have been limited to the category of hydrodynamic and electrical characteristics in view of the nature of the recording modes, or, in view of the fact that the direct energy to eject and sputter the liquid recording medium from the orifice of the nozzle in the form of droplets is electrical or mechanical.

As the totally improved recording method which has removed various disadvantages in the conventional recording methods as mentioned in the foregoing, there has already been proposed an improved recording method in U.S. Patent Application Ser. No. 948,236 of the same assignee as designated in the present application.

Therefore, the abovementioned conventional liquid recording medium is not necessarily satisfactory as the liquid recording medium for such improved recording method according to the present invention, in which the direct energy to cause the liquid recording medium to be ejected and sputtered from the orifice of the nozzle in the form of droplets is thermal energy. For example, in case the recording operation is conducted at a particularly high speed with the conventional liquid recording medium, the heat response (i.e., responsive property to the action of heat energy) of the liquid recording medium is not sufficient with the result that there may take place such occasion that stability in the formation of the droplet becomes deficient. Further, in a device having extremely fine nozzle, orifice, etc., there arise not infrequently such inconveniences that, when the continuous recording is conducted over a long period of time, feeding rate of the liquid recording medium in the nozzle is reduced to become unable to cope with the recording speed, or the heat response of the liquid recording medium lowers, or stability in the droplet formation reduces, or clogging occurs at the heat energy applying section of the nozzle, or others, whereby stabilized recording operation becomes difficult.

Thus, when the liquid recording medium which has so far been used is employed in the recording method as disclosed in the abovementioned U.S. Patent Application Ser. No. 948,236, there often take place various phenomena unfavorable to the stable recording operation with the consequence that high quality recorded image having high clarity, sufficient image density, and being free from satellite dots cannot be obtained, and the advantage in the abovementioned improved recording method cannot be fully utilized. In consequence of this, the characteristics to be imparted to the liquid recording medium which may be suitably adopted for the abovementioned recording method should be considered from an entirely different standpoint from the conventional liquid recording medium.

The present invention has been accomplished as the results of studies and researches on the aforementioned points of view.

SUMMARY OF THE INVENTION

It is therefore the primary object of the present invention to provide a liquid recording medium which is very small in its consumption of heat energy, has sufficient heat response in the case of high speed recording, and is excellent in stability in the droplet formation.

It is the secondary object of the present invention to provide a liquid recording medium which can produce and maintain with constant stability recorded images of high quality such as high clearness in the recorded image, satisfactory image density, and freedom from the satellite dots, even when the continuous recording operation is conducted over a long period of time.

It is the third object of the present invention to provide an improved liquid recording medium suitable for use in a recording method which can be utilized in a recording device of a simple construction, or multi-nozzle construction, or capable of carrying out high speed recording.

According to the present invention, in one aspect thereof, there is provided a liquid recording medium for use in a recording method, in which the liquid recording medium is ejected in droplet form from an orifice of a nozzle by the action of heat energy, and the thus ejected liquid recording medium is impinged on an image recording member for recording of image, the liquid recording medium comprising (a) recording agent which is a component to form a recorded image, and (b) carrier liquid to dissolve or disperse the recording agent, in which a different $\Delta T$ between a decomposition temperature of a substance having the lowest decomposition temperature among the substances constituting the recording agent and a boiling point of the liquid recording medium, exclusive of the recording agent is at least 30° C.

According to the present invention, in another aspect thereof, there is provided a liquid recording medium, wherein a gas in a quantity of 0.01 ml or more in terms of the conditions of 0° C. and 760 mm Hg is dissolved in 1 ml of the liquid recording medium at a normal ambient temperature, at which the liquid recording medium is used.

DESCRIPTION OF PREFERRED EMBODIMENT

Figure 1:
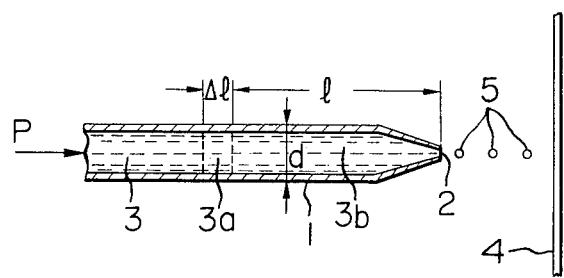
FIG. 1 is an explanatory diagram for the principle of ejecting the liquid recording medium by the action of heat energy from an ejecting device.

The liquid recording medium according to the present invention is composed of a recording agent to form a recorded image, a carrier liquid to dissolve or disperse the recording agent, and additives to be added depending on necessity. These three components are properly selected and admixed in such a way that a difference $\Delta T$ between a decomposition temperature of the recording agent and a boiling point of the liquid recording medium except for the recording agent may be 30° C. or higher.

The liquid recording medium may also be prepared in such a way that a gas in an amount of 0.01 ml or more in terms of the condition of 0° C. and 760 mm Hg is dissolved in 1 ml of the liquid recording medium at a normal ambient temperature, at which the liquid is used.

By "boiling point of the liquid recording medium except for the recording agent", it is meant the boiling point of the liquid medium, in case the liquid recording medium as prepared consists of a recording agent and a carrier liquid; and the boiling point of a composite system consisting of the carrier liquid and additives, but except for the recording agent, in case the liquid recording medium as prepared consists of the recording agent, the carrier liquid, and the additives.

In a system containing a plurality of carrier liquid components, it is difficult, from time to time, to determine a single boiling point. In such case, the highest boiling point which any one of these carrier liquid components indicates may be used as the boiling point of the carrier liquid component.

By "difference $\Delta T$ of 30° C. and higher between the decomposition temperature of the recording agent and the boiling point of the liquid recording medium except for the recording agent", it is meant the difference between the decomposition temperature of the recording agent per se and the boiling point of the liquid recording medium except for the recording agent as defined above, when the recording agent is of a single component system; and the difference between the decomposition temperature of a substance having the lowest decomposition temperature among those substances constituting the recording agent and the boiling point of the liquid recording medium as defined above, when the recording agent is of a composite component system.

Further, by "normal ambient temperature when the liquid recording medium is used", it is meant an environmental temperature (including a temperature within a room), at which human-beings generally live, i.e., a temperature range of from $-10°$ C. to 50° C.

According to the present invention, there can be obtained such desirable liquid recording medium which is remarkably small in consumption of heat energy necessary for the recording, is extremely favorable in the heat response and stability in the droplet formation, is capable of coping with the recording speed in its liquid feeding speed in the nozzle to a satisfactory extent, is free from lowering in the heat response and stability in the droplet formation with lapse of time, and does not bring about clogging of the nozzle at its heat energy applying section. Such liquid recording medium can be realized by appropriately selecting and mixing the carrier liquid and the recording agent, and, if necessary, adding the additives, in such a manner that the value of $\Delta T$ may become 30° C. or higher, and also, by positively dissolving a gas in the liquid recording medium in an amount more than a determined quantity as calculated in terms of the dissolved quantity of such gas when converted to 0° C.

Therefore, by the use of the liquid recording medium of the present invention, stable recording operation can always be attained with a low energy consumption, and the resulting recorded image is high in its clearness, is sufficient in its image density, and is free from satellite dots.

An extremely favorable result can be obtained, in particular, when the temperature difference $\Delta T$ between the decomposition temperature of the recording agent and the boiling point of the liquid recording medium component except for the recording agent is set at 30° C. or higher, preferably 40° C. or higher, or optimumly 50° C. or higher, and the dissolved quantity of a gas in the liquid recording medium at a normal ambient temperature is 0.01 ml/ml or higher, or preferably in a quantity to satisfy the following equation, as calculated in terms of the conditions of 0° C. and 760 mm Hg $$V_1 = \frac{273 \times V_2}{T_2} \text{ (ml/ml)}$$

(where: $V_1$ (ml/ml) denotes a dissolved quantity of a gas at an ambient temperature $T_2$ (the absolute temperature) as calculated in terms of the conditions of 0° C. and 760 mm Hg; and $V_2$ denotes a dissolved quantity of the gas at a certain ambient temperature $T_2$, a value of 0.0132 (ml/ml) or higher in the present invention.)

While the upper limit of the value $V_1$ is a saturated value to be determined by the class of the carrier liquid and the gas to be used, it may be approximately a value of pure water, in case a carrier liquid principally composed of water is used as the carrier.

In the following, detailed explanations will be given as to various components constituting the liquid recording medium according to the present invention.

CARRIER LIQUID

The carrier liquid for use in the present invention is for dissolving or dispersing the recording agent, and various sorts of the so-called "solvent" available in general market can be effectively used for this purpose.

Such carrier liquid can be broadly classified into an aqueous type solvent and a non-aqueous type solvent. Examples of such non-aqueous solvents are alkylalcohols having 1 to 10 carbon atoms such as methyl alcohol, ethyl alcohol, n-propyl alcohol, iso-propyl alcohol, n-butyl alcohol, sec-butyl alcohol, tert-butyl alcohol, iso-butyl alcohol, amyl alcohol, hexyl alcohol, heptyl alcohol, octyl alcohol, nonylalcohol, decyl alcohol, etc.; hydrocarbon solvents such as hexane, octane, cyclopentane, benzene, toluene, xylol, etc.; halogenated hydrocarbon solvents such as carbon tetrachloride, trichloroethylene, tetrachloroethane, dichlorobenzene, etc.; ether solvents such as ethylether, butylether, ethylene glycol diethylether, ethylene glycol monoethylether, etc.; ketone solvents such as acetone, methylethylketone, methylpropylketone, methylamylketone, cyclohexane, etc.; ester solvents such as ethyl formate, methyl acetate, propyl acetate, phenyl acetate, ethylene glycol monoethylether acetate, etc; alcohol solvents such as diacetone alcohol, etc.; and high-boiling hydrocarbon solvents.

The above-mentioned carrier liquids are suitably selected in consideration of their affinity for the recording agent and other additives to be added depending on necessity, and, in order to satisfy the foregoing requirements, they may be used as a mixture of two or more kinds, or a mixture with water, if necessary, within such a limit that a desirable recording medium is obtainable.

Among the carrier liquids mentioned above, preferred are water, or water soluble solvents, especially water-alcohol mixtures in consideration of ecology, availability and ease in preparation.

RECORDING AGENT

The recording agent has to be selected in relation to the above-mentioned carrier liquid and to the additive materials so as to prevent sedimentation or coagulation in the nozzles and reservoir as well as clogging of pipes and orifices after prolonged standing. In the present invention, therefore, preferred is the use of recording agents soluble in the carrier liquid, although those recording agents which are difficult to solve in the carrier liquid are also usable for the purpose of the present invention so far as the size of dispersed particles is sufficiently small.

The recording agent to be employed in the present invention is to be suitably selected according to the image recording member and other recording conditions to be used in the recording. For this purpose, various kinds of conventionally known dyes and pigments are effectively usable.

The dyes that can be effectively employed in the present invention are those capable of satisfying the foregoing requirements for the prepared liquid recording medium, and including water-soluble dyes such as direct dyes, basic dyes, acid dyes, acid mordant dyes and mordant dyes; and water-insoluble dyes such as sulphur dyes, sulphur vat dyes, oil dyes, and disperse dyes; and other dyes such as reactive dyes, azoic dyes, etc.

Concretely, the below-listed dyestuffs may be used. Numbers in parentheses are Color Index numbers.

1. Direct Dyes

Direct Pure Yellow 5G (13920), Sirius Yellow GC (29000), Sumilight Orange G conc. (29050), Dialuminous Rubine B (29225), Sumilight Supra Red Violet RL (25410), Direct Sky Blue 6B (24410), Sumilight Supra Turquoise Blue G conc. (74180), Diacupro Green G (34040), Benzo Catechine G (36030), Direct Fast Black B (35435), Direct Fast Black conc. (27720), Sirius Black L (27720), Aizen Primula Gray-VGLH extra conc. (25040).

2. Acid Dyes

Kayaku Acid Brilliant Flavine FF (56205), Metanil Yellow YK (13065), Sumilan Orange G extra conc. (18745), Suminol Leveling Red 6BL extra conc. (17065), Aizen Erythrosine (45430), Alizarine Rubinol R (68215), Aizen Eosine GH conc. (45380), Anthraquinone Violet 1149 (61710, 61800), Suminol Leveling Blue AGG (62125), Carbolan Green G (61580), Alizarine Light Brown BL 190% (66710), Nigrosine NB conc. (50420), Suminol Milling Black VLG (27070), Sumilan Black WA (15711), Dialeather Black B (30336).

3. Black Dyes

Auramine Extra O-125 (41000), Sumiacryl Yellow 3G (48055), Sumitomo Acridine Orange NO (46005), Sumiacryl Orange G(48035), Phodamine 6GCP (45160), Aizen Methyl Violet BB Special (42535), Crystal Violet ex.pdr. (42555), Rhodamine B(45170), Magenta(42510), Methylene Blue conc.(52015), Aizen Victoria Blue BH(44045), Aizen Malachite Green(42000), Bismarck Brown G conc.(21000), Aizen Cathilon Gray BLH(11825).

4. Mordant Acid Mordant Dyes

Sunchromine Yellow MD 120%(14095), Sunchromine Orange GR(26520), Mitsui Alizarine B(58000), Sunchromine Brilliant Red B(45305), Sunchromine Violet B(14750), Sunchromine Blue FBG(43855), Sunchromine Green LG conc.(17225), Sunchromine Brown RH conc.(13250), Sunchromine Black P2B(16505), Diamond Black PBB(16505), Sunchromine Blue Black PB conc. (63615), Sunchromine Blue Black R conc.(15705).

5. Azoic Dyes

Fast Violet B Base, Salt(37165), Naphtol AS-BG(37545).

6. Sulphur, Sulphur Vat Dyes

Kayasol Yellow R(53121), Kayasol Orange O(53106), Kayasol Bordeaux B(53810), Thionol Navy Blue RMS(53236), SO-Dye-sul Liquid Green B(53571), Kayasol Brown G(53021), Sulphur Black BB(53185), Kayasol Black B(53186), Cabanol Blue LBN(53630). 7. Vat Dyes Nihonthrene Golden Yellow RKP pst(59105), Nihonthrene Brilliant Violet RR D/P(60010), Indigo Pure BASF pdr. K(73000), Mitsui Indigo Vat 60% Grain (73001), Mikethrene Soluble Blue O(73002), Anthrasol Gray IBL(73671), Indanthrene Yellow 4GF (68420).

8. Disperse Dyes

Kayalon Fast Yellow G(11855), Dianix Fast Yellow YL M/D(10338), Celliton Fast Pink FF3B(62015), Kayalon Fast Violet BR(62030), Celliton Fast Blue FFR(61505).

9. Oil Dyes

Waxoline Yellow IM(12055), Zapon Fast Yellow 3RE(11700), Rhodamine B Base (45170B), Zapon Fast Blue HFL(74350), Sudan Deep Black BB(26150), Nigrosine Base LK(50415), Vali Fast Yellow #3105(18690).

10. Reactive Colours

Cibacron Brilliant Yellow 3G-P(18972), Diamira Yellow G, Levafix Golden Yellow E-G, Cibacron Brilliant Red 2G-P, Remazol Yellow GNL, Sumifix Red B, Remazol Red B, Levafix Brilliant Red E-4B, Sumifix Brilliant Blue R(61200), Diamira Brilliant Blue B, Diamira Blue 3R, Remazol Blue 3R, Remazol Brilliant Green 6B, Diamira Brown 3G, Cibacron Black FBG-A (17916), Procion Black H-N.

These dyes are used in the form of solution or dispersion in the carrier liquid suitably selected for the intended purpose.

The pigments effectively employable in the present invention include various inorganic and organic pigments, and preferred are those having an elevated infrared absorbing efficiency when infrared ray is used as the source of thermal energy. Examples of such inorganic pigment include cadmium sulfide, sulfur, selenium, zinc sulfide, cadmium sulfoselenide, chrome yellow, zinc chromate, molybdenum red, guignet's green, titanium dioxide, zinc oxide, red iron oxide, green chromium oxide, red lead, cobalt oxide, barium titanate, titanium yellow, black iron oxide, iron blue, litharge, cadmium red, silver sulfide, lead sulfide, barium sulfate, ultramarine, calcium carbonate, magnesium carbonate, white lead, cobalt violet, cobalt blue, emerald green, carbon black, etc.

For organic pigments, most of them belong to organic dyes in classification, hence overlapping between them preferred examples of such organic pigments effectively usable in the present invention are as follows:

(a) Insoluble azo-pigments (naphthols):

Brilliant Carmine BS, Lake Carmine FB, Brilliant Fast Scarlet, Lake Red 4R, Para Red, Permanent Red R, Fast Red FGR, Lake Bordeaux 5B, Bar Million No. 1, Bar Million No. 2, Toluidine Maroon;

(b) Insoluble azo-pigments (anilids):

Diazo Yellow, Fast Yellow G, Fast Yellow 10G, Diazo Orange, Vulcan Orange, Ryrazolon Red;

(c) Soluble azo-pigments;

Lake Orange, Brilliant Carmine 3B, Brilliant Carmine 6B, Brilliant Scarlet G, Lake Red C, Lake Red D, Lake Red R, Watchung Red, Lake Bordeaux 10B, Bon Maroon L, Bon Maroon M;

(d) Phthalocyanine pigments:

phthalocyanine Blue, Fast Sky Blue, Phthalocyanine Green;

(e) Lake pigments:

Yellow Lake, Eosine Lake, Rose Lake, Violet Lake, Blue Lake, Green Lake, Sepia Lake;

(f) Mordant dyes:

Alizarine Lake, Madder Carmine;

(g) Vat dyes:

Indanthrene, Fast Blue Lake (GGS);

(h) Basic dye Lakes:

Rhodamine Lake, Malachite Green Lake;

(i) Acid dye Lakes:

Fast Sky Blue, Quinoline Yellow Lake, quinacridone pigments, dioxazine pigments.

The ratio of the above-mentioned carrier liquid and recording agent to be employed in the present invention is determined in consideration of eventual nozzle clogging, eventual drying of recording liquid in the nozzle, clogging on the image recording member, drying speed thereon, etc., and is generally selected within a range, with respect to 100 parts by weight of carrier liquid, of 1 to 50 parts by weight of recording agent, preferable 1 to 30 parts by weight, and most preferably 2 to 10 parts by weight of the recording agent.

In case the liquid recording medium consists of a dispersion, wherein particles of the recording agent are dispersed in the carrier liquid, the particle size of the dispersed recording agent is suitably determined in consideration of the kind of recording agent, recording conditions, inner diameter of the nozzle, diameter of the orifice, kind of image-recording member, etc. However, an excessively large particle size is not desirable as it may result in sedimentation of the recording agent during storage, which causes non-uniform concentration, nozzle clogging, or non-uniform density in the recorded image.

In order to avoid such troubles the particle size of the recording agent in a dispersed liquid recording medium to be employed in the present invention is generally selected within a range from 0.0001 to $30\mu$, preferably from 0.0001 to $20\mu$, and most preferably from 0.0001 to $8\mu$. Besides the particle size, distribution of such dispersed recording agent should be as narrow as possible. It is generally selected within a range of $D \pm 3\mu$, and preferably within a range of $D \pm 1.5\mu$, where D stands for an average particle size.

In the present invention, the recording agent is selected in such a manner that the liquid recording medium may have, in relation to the carrier liquid and the additives to be added depending on necessity, a temperature difference $\Delta T$ of 30° C. or higher, that is, the decomposition temperature of the recording agent is higher by 30° C. or above than the boiling point of the components constituting the liquid recording medium. The liquid recording medium exhibiting more remarkable effect can be obtained, if the recording agent having $\Delta T$ of 150° C. or higher, or more preferably 200° C. or higher, is selected.

For the gas to be dissolved in the liquid recording medium according to the present invention, any kind of gas, that does not cause mal-effect such as yielding of precipitation in the liquid recording medium, bringing about undesirable chemical reaction with other components constituting the liquid recording medium, and being harmful to human bodies, can be suitably used.

Concrete examples of such gases are: hydrogen, nitrogen, oxygen, air, helium, neon, argon, krypton, xenon, methane, ethane, ethylene, acetylene, and so on. These gases may also be used in proper mixture among them depending on necessity. Of these gases, $N_2$, $CO_2$, $O_2$ and air can be preferably adopted for the purpose of the present invention from the economical standpoint.

The quantity of the gas to be dissolved in the liquid recording medium according to the present invention is so determined that the liquid recording medium having desired characteristics may be obtained. A physical value of the dissolving quantity of the gas to satisfy this condition should desirably be 0.01 ml or above per 1 ml of the liquid recording medium, or, usually, 0.0132 ml or above, when the dissolved quantity of the gas in a usual ambient temperature region including, for example, room temperature, is converted to the conditions of 0° C. and 760 mm Hg.

Dissolution of the gas in a predetermined quantity into the liquid recording medium can be effected by blowing the gas into the liquid recording medium, or blowing the same into the liquid medium which has previously been cooled.

The liquid recording medium for use in the present invention is essentially composed of the carrier liquid and the recording agent as explained in the foregoing, but it may further contain other additive materials for realizing or improving the aforementioned characteristics required for the recording.

Such additive materials include viscosity regulating agents, surface tension regulating agents, PH regulating agent, resistivity regulating agent, wetting agents, infrared-absorbing heat-generating agents, etc.

Such viscosity regulating agent and surface tension regulating agent are added principally for attaining sufficient fluidity in the nozzle to keep up with the recording speed, for preventing dropping of recording medium from the orifice of nozzle to the external surface thereof, and for blotting (expansions of spot as sputtered) on the image recording member.

For these purposes, any known viscosity regulating agent or surface tension regulating agent is applicable as long as it does not provide undesirable effect to the carrier liquid and recording agent.

Examples of such viscosity regulating agent are polyvinyl alcohol, hydroxypropylcellulose, carboxymethyl cellulose, hydroxyethyl cellulose, methyl cellulose, water-soluble acrylic resins, polyvinylpyrrolidone, gum arabic, starch, etc.

The surface tension regulating agents effectively usable in the present invention include anionic, cationic and nonionic surface active agents, such as polyethylene glycolether sulfate, ester salt, etc. as the anionic compound; poly-2-vinylpyridine derivatives, poly-4-vinylpyridine derivatives, etc. as the cationic compound; and polyoxyethylene alkylether, polyoxyethylene alkylphenylether, polyoxyethylene alkyl esters, polyoxyethylene sorbitan alkylester, polyoxyethylene alkylamines, etc. as the nonionic compound. In addition to the abovementioned surface active agents, there can be effectively employed other materials such as amine acids such as diethanolamine, propanolamine, morphole, etc., basic compounds such as ammonium hydroxide, sodium hydroxide, etc., and substituted pyrrolidones such as N-methyl-2-pyrrolidone, etc.

These surface tension regulating agents may also be employed as a mixture of two or more compounds so as to obtain a desired surface tension in the prepared liquid recording medium and within a limit that they do not undesirably affect each other or affect other constituents.

The amount of the surface tension regulating agent is determined suitably according to the kind thereof, kind of other constituents, and desired recording characteristics. It is generally selected, with respect to 1 part by weight of recording medium, in a range of from 0.0001 to 0.1 parts by weight, and preferably from 0.001 to 0.01 parts by weight.

The pH regulating agent is added in a suitable amount to achieve a determined pH value, thereby improving the chemical stability of prepared liquid recording medium, and avoiding changes in the physical properties of the medium as well as sedimentation or coagulation of the recording agent or other components therein during a prolonged storage.

As the pH regulating agent adapted for use in the present invention, there can be employed almost any kind of materials capable of achieving a desired pH value without giving undesirable effects to the prepared liquid recording medium.

Examples of such pH regulating agent are lower alkanolamine monovalent hydroxides such as alkali metal hydroxide, ammonium hydroxide, etc.

Such pH regulating agent is added in an amount required for realizing a desired pH value in the prepared recording medium.

In case the recording is conducted by electrically charging the droplets of the liquid recording medium, the resistivity thereof is an important factor for determining the charging characteristics. In order that the droplets can be charged for a satisfactory recording, the liquid recording medium should have a resistivity generally within a range of $10^{-3}$ to $10^{11}$ $\Omega$cm.

Examples of resistivity regulating agent to be added in a suitable amount to achieve the resistivity as explained above in the liquid recording medium are inorganic salts such as ammonium chloride, sodium chloride, potassium chloride, etc., water-soluble amines such as triethanolamine, etc., and quaternary ammonium salts.

In the recording, wherein the droplets are not electrically charged, resistivity of the recording medium need not be controlled.

As the wetting agent adapted for use in the present invention, there can be employed various materials known in the technical field related to the present invention, among which preferred are those thermally stable. Examples of such wetting agent are polyalkylene glycols such as polyethylene glycol, polypropylene glycol, etc.; alkylene glycols containing 2 to 6 carbon atoms such as ethylene glycol, propylene glycol, butylene glycol, hexylene glycol, etc.; lower alkyl ethers of diethylene glycol such as ethyleneglycol methylether, diethyleneglycol methylether, diethyleneglycol ethylether, etc.; glycerin; lower alcoxy triglycols such as methoxy triglycol, ethoxy triglycol, etc.; N-vinyl-2-pyrrolidone oligomers, etc.

Such wetting agents are added in an amount required for achieving desired properties in the recording medium, and is generally added within a range of from 0.1 to 10 wt.%, preferably 0.1 to 8 wt.%, and most preferably 0.2 to 7 wt.%, with respect to the total weight of the liquid recording medium.

The abovementioned wetting agents may be used, in addition to their individual use, as a mixture of two or more of them as long as they do not undesirably affect each other.

In addition to the foregoing additive materials, the liquid recording medium of the present invention may further contain resinous polymers such as alkyd resin, acrylic resin, acrylamide resin, polyvinyl alcohol, polyvinyl-pyrrolidone, etc. in order to improve the film-forming property and coating strength of the recording medium when it is deposited on the image recording member.

In case of using laser energy, particularly, infrared laser energy, it is desirable that an infrared-absorbing heat-generating material be added to the liquid recording medium to improve the effect of laser energy. Such infrared-absorbing materials are mostly in the family of the afore-mentioned recording materials and are preferably dyes or pigments showing a strong infrared absorption. Examples of such dyes are water-soluble nigrosin dyes, denatured water-soluble nigrosin dyes, alcohol-soluble nigrosin dyes which can be rendered water-soluble, and so forth, while the examples of such pigments include inorganic pigments such as carbon black, ultramarine blue, cadmium yellow, red iron oxide, chrome yellow, etc., and organic pigments such as azo pigments, triphenylmethane pigments, quinoline pigments, anthraquinone pigments, phthalocyanine pigments, etc.

In the present invention, the amount of such infrared absorbing heat-generating material, when it is used in addition to the recording agent, is generally selected within a range of 0.01 to 10 wt.%, preferably 0.1 to 5 wt.%, with respect to the total weight of the liquid recording medium.

The amount should be maintained at a minimum necessary level, particularly when such infrared-absorbing material is insoluble in the carrier liquid, since excessive quantity may result in sedimentation, coagulation or nozzle clogging, for example, during storage of the liquid recording medium, though the extent of such phenomena is dependent on the particle size in the dispersion.

In addition to the conditions of $\Delta T$ (a temperature difference between the decomposition temperature of the recording agent and the boiling point of the liquid recording medium exclusive of the recording agent) and the quantity of dissolved gas to provide the liquid recording medium with the abovementioned various characteristics, the liquid recording medium of the present invention is so prepared that the values of the following physical properties may be within a specific conditional range: for example, specific heat, thermal expansion coefficient, thermal conductivity, viscosity, surface tension, pH, and resistivity when the recording is performed using droplets of electrically charged liquid recording medium. In other words, these various physical properties play an important role on the characteristics of the liquid recording medium to be defined by $\Delta T$ and the dissolved quantity of gas such as, for example, stability in droplet-forming phenomenon, response and fidelity to the effect of thermal energy, chemical stability, fluidity in the nozzle, and so forth. Accordingly, these physical properties of the liquid should preferably be taken into consideration when preparing the liquid recording medium according to the present invention.

The following Table 1 shows an example of the numerical range of the liquid physical properties which the liquid recording medium of the present invention should satisfy. So far as the liquid recording medium is prepared in a manner to satisfy the abovementioned conditions with regard to $\Delta T$ and the dissolved quantity of gas, it is not mandatory that all the physical properties listed above should satisfy the numerical conditions shown in Table 1, but some of them may take the values to satisfy the Table 1 conditions depending on the recording characteristics required of the liquid recording medium. Nevertheless the conditions for the specific heat, thermal expansion coefficient, and thermal conductivity shown in Table 1 should be met by all the recording media. Also it is to be understood that the more the conditions are met by the recording medium, the better becomes the result of the recording.

Table 1

| Property (unit) | General range | Preferred range | Most Preferred range |
| --- | --- | --- | --- |
| Specific heat (Jg°K) | 0.1–4.0 | 0.5–2.5 | 0.7–2.0 |
| Thermal expansion coefficient ($\times 10^{-3}$ deg$^{-1}$) | 0.8–1.8 | 0.5–1.5 | |
| Viscosity (centipoise; 20° C.) | 0.3–3.0 | 1–20 | 1–10 |
| Thermal conductivity ($\times 10^{-3}$ W/cm.deg) | 0.1–50 | 1–10 | |
| Surface tension (dyne/cm) | 10–85 | 10–60 | 15–50 |
| pH | 6–12 | 8–11 | |
| Resistivity ($\Omega$cm)* | $10^{-3}$–$10^{11}$ | $10^{-2}$–$10^9$ | |

*Applicable when the droplets are charged at the recording.

The liquid recording medium prepared in the abovementioned manner can be suitably used in the device proposed in the copending U.S. application Ser. No. 948,236 of the same assignee designated in the present application (the device, in which the liquid recording medium is ejected and sputtered from an orifice in the form of droplets by the action of heat energy). The principle of ejecting the liquid recording medium and various types of such device are detailed in the specification of this copending application, to which reference may be had.

Briefly explaining the device in reference to FIG. 1, a nozzle 1 contains therein the liquid recording medium 3 of the present invention which has been pressurized to a desired pressure level by an appropriate compression means such as pump, etc. When the liquid recording medium 3a in the nozzle 1 having a length l from its orifice 2 is subjected to the action of heat energy at one section thereof having a width $\Delta$l (heat applying section), a part or substantially entire part of the liquid recording medium 3a present in the heat applying section with the width $\Delta$l in the nozzle 1 is ejected from the orifice due to abrupt change in the liquid state (such as generation of foams, etc.), and in accordance with amount of energy acted thereon, whereby the liquid recording medium dashes toward a recording member 4 and adheres at predetermined positions thereon. Subsequently, there take place stoppage in the supply of heat energy and replenishment of the liquid recording medium in a quantity corresponding to the ejected, and the nozzle interior returns to the normal condition.

In the liquid recording medium of the present invention, the other components than the recording agent with the carrier liquid as the principle constituent boils up in a sufficiently low temperature region (i.e., the abrupt change in the liquid state) in comparison with the decomposition temperature of the recording agent to generate energy for ejecting droplets of the liquid recording medium. Accordingly, the liquid recording medium is excellent in its heat response and thermal efficiency, etc. to the heat energy acted thereon. Also, the droplet formation can be effected very stably, and the fluid state of the liquid within the nozzle hardly changes even when continuous recording is conducted over a long period of time. Further, clogging of the nozzle at its heat applying section is hard to occur. Furthermore, the resulting recorded image is superior in its image quality in that, even when such long, continuous recording is conducted, the image density and contrast hardly change, and adherence of satellite dots occurs few.

The size of the droplets 5 of the liquid recording medium ejected from the orifice 2 depends on the heat energy quantity, width $\Delta$l of the heat applying section 3a of the nozzle 2 where the liquid recording medium is subjected to action of heat energy, a bore d of the nozzle 2, a length l of the nozzle 2 from the orifice 2 to a position where heat energy acts thereon, applied pressure P, specific heat, heat conductivity, and thermal expansion, etc. of the liquid recording medium. By changing any of these parameters, the size of the droplet 5 can be easily controlled.

For the energy to be acted on the liquid recording medium 3a in the heat applying section Δl of the nozzle 1, there may usually be used electric energy or laser energy, or others.

When the electrical energy, for example, is used, there may be adopted various methods such as providing a heat conversion member such as the so-called thermal head or Peltier element, etc. on the nozzle 1 either directly or indirectly. When the laser energy is used, a heat generating layer to absorb electromagnetic wave energy such as laser is provided on the outer surface of the nozzle 1.

Figure 2:
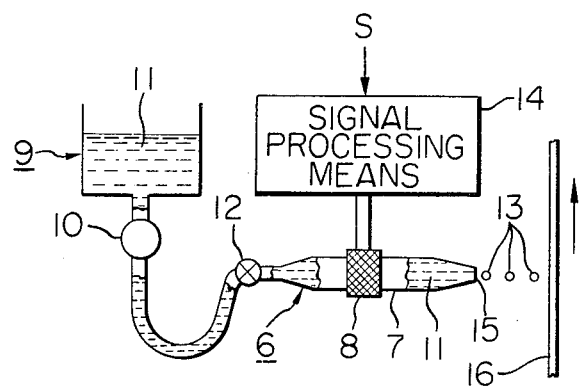
FIG. 2 is one embodiment of a device for ejecting the liquid recording medium by the action of heat energy.

FIG. 2 shows one preferred embodiment of the recording device, in which the recording operation is carried out in a "droplet on demand" fashion in utilization of the electrical energy as the heat conversion energy. In the illustration, a recording head 6 is of such a construction that an electric heat conversion member 8 such as, for example, a thermal head is provided at a predetermined position with a predetermined length from the tip end of a nozzle 7. The interior of the nozzle 7 is filled with a recording medium in a liquid form which is supplied thereinto through a flow rate adjusting valve 12 from a liquid feeding section 9 including a reservoir, etc. under a predetermined pressure by a pump 10.

Explaining concretely the method for recording by this device, a record information signal S is introduced as an input into a signal processing means 14 where the input signal is converted into an ON-OFF pulse signal, and the pulse signal is applied to the electric heat conversion member 8. When the pulse signal is applied to the electric heat conversion member 8, the member 8 instantaneously generates heat, and the thus generated heat energy acts on the liquid recording medium 11 within the heat applying section of the nozzle 7. The liquid recording medium 11 subjected to the action of heat energy abruptly changes its state, and is ejected from an orifice 15 of the nozzle 7 in the form of droplets 13, and dashes toward a recording member 16 to adhere thereon.

The size of the droplets 13 depends on the quantity of the liquid recording medium present in the sector from the position of the electric heat conversion member 8 to the nozzle 7 (or orifice 15), physical parameters of the liquid recording medium, magnitude of pulse signal, and so forth.

When the droplets 13 of the liquid recording medium are ejected from the orifice 15 of the nozzle 7, a quantity of the liquid recording medium corresponding to the droplets as ejected therethrough is replenished from the liquid feeding section 9, whereby the nozzle interior reinstates its original, thermally standing state until a subsequent pulse signal is applied to the heat applying section of the nozzle. It should be noted that the feeding time of the liquid recording medium be shorter than the on-off period of the pulse signal to be applied.

As already mentioned in the explanations of FIG. 1, since the liquid recording medium according to the present invention has favorable fluidity within the nozzle, the property of which is hardly reduced or lowered, the feeding time of the liquid recording medium is short and the heat response at a high frequency is extremely favorable, hence high speed recording operation becomes feasible.

Figure 3:
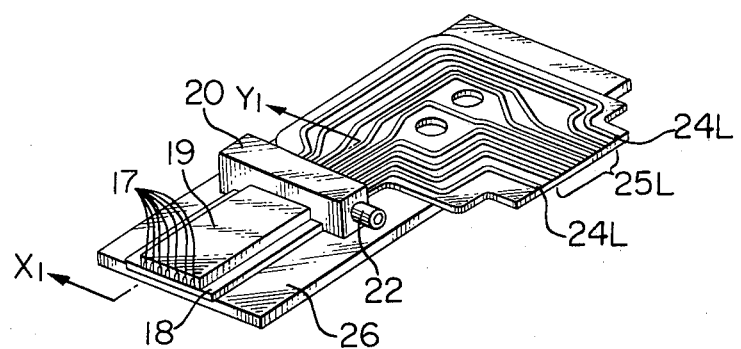
FIG. 3 is a schematic perspective view showing one embodiment of a liquid recording medium ejecting device having a multi-orifice construction.

FIG. 3 shows one embodiment of the recording device illustrated in FIG. 2 having a multi-orifice structure. By thus providing a plurality of nozzles, the recording speed can be farther increased.

Figure 4:
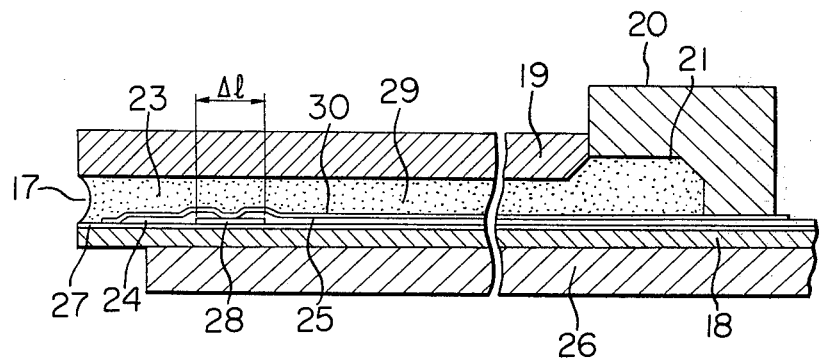
FIG. 4 is a cross-sectional view of the device in FIG. 3 taken along the line $X_1$-$Y_1$.

FIG. 4 is a cross-sectional view of the device shown in FIG. 3 taken along the line $X_1$-$Y_1$. IN FIG. 3, seven orifices 17 are provided for the sake of convenience in the explanation. In general, two or more numbers of the orifice may be provided depending on the purpose.

The device shown in FIG. 4 is so constructed that a grooved lid or cover 19 formed therein with seven grooves is fixedly secured to the tip end part of a base plate 18 with the grooved side thereof facing the base plate, thereby forming seven ejecting nozzles and orifices 17 by the base plate and the grooved lid. A reference numeral 20 designates a cover for a liquid feeding chamber which constitutes a common liquid feeding chamber 21 for feeding the liquid recording medium to each of the seven nozzles together with the abovementioned grooved lid 19. Leading to the liquid feeding chamber 21, there is provided a conduit 22 for feeding the liquid recording medium from an external reservoir (not shown).

At the rear end part of the base plate 18, there are disposed a common electrode 24 of the electric heat conversion member 23 and leads 24L and 25L for each of the individual electrodes 25. On the back surface of the base plate 18, there is provided a heat sink 26 depending on necessity.

FIG. 4 shows the cross-sectional construction of one of the nozzles in the device of FIG. 3. The electric heat conversion member 23 is basically constructed with a heat generating resistance body 28 provided on a regenerative layer 27 which is formed on the base plate 18 depending on necessity by evaporative deposition, plating, and other methods, and the common electrode 24 and the individual electrodes 25 for conducting electricity to the heat generating resistance body 28. In addition to this, there may be provided an insulative protective layer 30, as the case may be, which prevent leakage of electricity between the electrodes due to the liquid recording medium 29, contamination of the electrodes 24 and 25 as well as the heat generating resistance body 28 due to the liquid recording medium 29, and oxidation of the heat generating resistance body 28.

The liquid feeding chamber 21 is formed as a space defined by surrounding grooved lid 19, the cover 20 and the base plate 18, and communicates with each of the seven nozzles formed by the base plate 18 and the grooved lid 19 and also with the conduit 22 so that the liquid recording medium to be supplied from outside through the conduit 22 may be dispensed to each of the seven nozzles. The volume and shape of the liquid feeding chamber 21 may be so determined that, when back waves to be generated at the heat applying section 1 of each nozzle propagate inward of the chamber 21 without being absorbed in the nozzle, sufficient impedance may be given thereto to prevent occurrence of any interference in the nozzles due to the back waves.

The recording device constructed in this way has very fine nozzles and orifices as its advantage in construction, hence the multi-orifice construction can be readily realized, and high speed recording or high resolution recording can be performed.

When the liquid recording medium according to the present invention is used with this recording device, there can be obtained particularly preferable results.

EXAMPLE 1

The following components were sufficiently mixed to prepare uniformly dispersed violet liquid recording medium (specimen $A_1$).

| | |
|---|---|
| Crystal violet (C.I. Basic Violet: C.I. No. 42555) (primary reagent of Kishida Kagaku K.K.) | 5 g. |
| Ion-exchanged water | 200 g. |

As a comparative specimen, the following components were uniformly mixed to obtain violet liquid recording medium (specimen $B_1$).

| | |
|---|---|
| Crystal violet (same as above) | 5 g. |
| Glycerine | 120 g. |
| Ion-exchanged water | 80 g. |

The melting point and the decomposition point of the abovementioned crystal violet were measured by the glass capillary method which is ordinarily adopted. It was found out that they are respectively 214° C. and 238° C., or higher.

Also, a difference $\Delta T$ between the decomposition point of crystal violet and the boiling point of the specimen $B_1$ excluding the crystal violet was measured. It was 5 to 8° C.

By the use of the specimens $A_1$ and $B_1$ prepared in the abovementioned manner, a continuous jet recording operation was conducted under the recording conditions as specified in Table 1 below by means of a recording device (on-demand type) having glass nozzles with orifices for ejecting the liquid recording medium, and a recording head (3000 lines with nozzle number of 10 lines/mm) constructed with the electric heat conversion member (heat generating body) provided on one part of the nozzles (hereinafter simply called "recording head"). A recorded image of the data as shown in Table 2 below was resulted on a recording member.

Table 1

| | |
|---|---|
| Orifice diameter | 50 microns |
| Drive conditions of heat generating body | 15 V, 200 μsec. |
| Maximum response frequency | 2 KHz |
| Recording member | High quality paper (in size A, 86.5 kg, manufactured by Sanyo Kokusaku Pulp K.K.) |
| Transfer speed of recording member | 20 cm/sec. |

Table 2

| | Evaluation of Image Quality | | | |
|---|---|---|---|---|
| Time lapse (min.) | 1 | 5 | 30 | 180 |
| Specimen $A_1$ | | | | |
| Specimen $B_1$ | | Δ | x | — |

Standard of Evaluation

⦾ : Excellent

◯ : Fair

Δ: Satellite dots observed to some extent, but not practically detrimental

×: Not practically usable

—: No image formation

The results of Table 2 can be explained as follows. When the recording operation is conducted using the specimen $B_1$, satellite dots appeared on the recorded image in about 5 minutes after start of the recording operation. After 30 minutes lapse, the size of the droplets ejected from the orifice and the ejecting interval of the droplets became considerably disturbed and unstable, and the recorded image formed on the recording member was lack in distinction, which was incapable of practical use. Further, after lapse of 150 minutes or so of the continued recording operation, no droplet could be ejected from the orifice, whereby no further recording operation could be continued. The examination for the cause revealed that the interior of the nozzle at the section thereof where the heat generating member is provided was clogged. On the other hand, when the recording operation was conducted using the specimen $A_1$, the recorded image was excellent in its image contrast, image density, and other qualities, the device was excellent in its stability of droplet formation in the continuous recording over a long period of time, and the liquid recording medium could maintain its fluidity. In this consequence, even after lapse of 180 minutes since start of the recording operation, the image quality was almost same as that immediately after commencement of the recording operation, the image quality of which was extremely good. Further, there could be observed almost no change in the quality of the recorded image obtained after lapse of 300 minutes, and the background (the white portion of the image recording member) was not contaminated at all.

Next, the abovementioned specimen $A_1$ was degassed, divided into nine equal portions, and was tightly sealed in a vessel. To each of these specimens, $N_2$, air and $CO_2$ gases were dissolved in a predetermined quantity to obtain Specimens $A_{11}$–$A_{19}$. The temperature at this time was 25° C.

Using the same recording device as in the abovementioned example, the recording operation was conducted. As the result, the liquid recording medium, in which the gas was dissolved, improved their heat response and energy efficiency, in particular, even in the continuous recording operation over a long period of time. Incidentally, when the dissolving quantity of the gas was increased beyond 0.0125 ml/ml, the effect of the addition tended to be remarkable.

Table 3

| Specimen | Kind of Gas | Dissolved quantity*) ($\times 10^{-2}$ml/ml) |
|---|---|---|
| $A_{11}$ | | 1.0 |
| $A_{12}$ | $N_2$ | 1.25 |
| $A_{13}$ | | 1.4 (saturated quantity) |
| $A_{14}$ | | 1.0 |
| $A_{15}$ | Air | 1.25 |
| $A_{16}$ | | 1.6 (saturated quantity) |
| $A_{17}$ | | 13.5 |
| $A_{18}$ | $CO_2$ | 30.0 |
| $A_{19}$ | | 72.0 (saturated quantity) |

*Values at 25° C. converted to those at 0° C.

EXAMPLE 2

Ion-exchanged water and n-propyl alcohol were mixed. To this mixture, a dyestuff (C.I. Direct Black 51—C.I. No. 27720—Japanol Fast Black conc.) was dissolved to prepare the liquid recording medium.

In preparing this liquid recording medium, mixing ratio of ion-exchanged water, n-propyl alcohol and dyestuff was changed in various ways to thereby obtain specimens $A_{21}$, $A_{22}$, $A_{23}$ and $A_{24}$ as shown in Table 4 below.

Table 4

| Speci-men | Mixing ratio (By Weight) | | | Evaluation of Image Quality Time Lapse (min.) | | | |
|---|---|---|---|---|---|---|---|
| | water | n-propyl alcohol | dyestuff | 1 | 120 | 300 | 420 |
| $A_{21}$ | 85 | 10 | 5 | | | | |
| $A_{22}$ | 60 | 35 | 5 | | | | |
| $A_{23}$ | 35 | 60 | 5 | | | | |
| $A_{24}$ | 10 | 85 | 5 | | | | |

(The standard of image evaluation is same as in Table 2)

Using these specimens, the jet recording was conducted under the same recording conditions as in Example 1 above by means of the recording device also used in Example 1. The recorded images were evaluated as in Table 4.

The difference $\Delta T$ in each of the specimens $A_{21}$ to $A_{24}$ was measured. It was 152° C. and above for all specimens.

EXAMPLE 3

8 g. of a dyestuff (C.I. Direct Red 83—C.I. No. 29225—Dialuminous Rubine B) was dispersed and dissolved in 92 g. of a solution composed of a carrier liquid and an additive, which was added depending on necessity, to prepare red liquid recording medium (specimens $A_{31}$, $A_{32}$, $A_{33}$, and $A_{34}$).

Using these specimens $A_{31}$ to $A_{34}$, the jet recording was continuously conducted under the same recording conditions as in Example 1 above by means of the recording device used also in Example 1. As the result, the obtained recorded images were evaluated as shown in Table 5 below.

Table 5

| Specimen | Carrier Liquid Additive | | $\Delta T$ | Evaluation of Image Quality Time Lapse (Min.) | | | |
|---|---|---|---|---|---|---|---|
| | | | | 2 | 120 | 300 | 420 |
| $A_{31}$ | Methanol | 92 g | 185° C. or above | | | | |
| $A_{32}$ | Ethanol | 92 g | 172° C. or above | | | | |
| $A_{33}$ | Ion-exchanged Water | 47 g | 130° C. or above | | | | |
| | Glycerine | 45 g | | | | | |
| | Ion-exchanged Water | 22 g | | | | | |
| $A_{34}$ | | | 100° C. or above | | | | |
| | Ethylene GLycol | 70 g | | | | | |

(The standard of image evaluation is same as in Table 2)

EXAMPLE 4

2 g. of "Zapon Fast Yellow 3RE" (C.I. Solvent Orange 45—C.I. No. 11700) was dissolved in 10 g. of acetone, followed by uniform mixture of the same with 98 g. of "ISOPAR E" (a trade-mark for a high purity isoparaffinic material having a distillation temperature range of from 116° C. to 143° C. a manufacture of Humble Oil & Refining Co.) to obtain yellow liquid recording medium (Specimen $A_4$).

As a comparative specimen, a liquid recording medium (specimen $B_4$) was prepared by using ISOPAR L (same as abovementioned Isopar E, but having a distillation temperature range of from 188° C. to 208° C.) in place of ISOPAR E.

Using these specimens $A_4$ and $B_4$, the jet recording operations were conducted continuously over a long period of time under the same recording conditions and by means of the same recording device as in Example 1 above. As the result, the recorded images were evaluated as in Table 6 below.

Table 6

| Specimen | $\Delta T$ | Evaluation of Image Quality Time Lapse (Min.) | | | |
|---|---|---|---|---|---|
| | | 2 | 10 | 60 | 180 |
| $A_4$ | 44° C. or above | | | | |
| $B_4$ | −28° C. or below | | Δ | x | — |

It is observed from the Table 6 results that, in the case of the specimen $B_4$, quality of the recorded image lowered after about 10 minutes since start of the recording operation; after lapse of 60 minutes, some of the nozzles became unable to eject the droplets; and the other nozzles tended to bring about satellite dots, whereby the resulting recorded image was not to a level of practical use. When the recording operation was continued in such state, almost all of the nozzles became unable to eject the droplets after lapse of 100 minutes, and the recording operation was no longer possible.

In contrast to this, when the specimen $A_4$ was used, there could be observed substantially no problem in the resulting recorded image, although the image quality slightly lowered from the time instant onward after lapse of 300 minutes since start of the recording operation, whereby stable recording could be effected.

EXAMPLE 5

The following components were uniformly mixed by agitation, and the resulted liquid was subjected to suction-filtration by use of a filter paper (Toyo Roshi No. 2) and a funnel, thereby obtaining a liquid recording medium (specimen $A_5$). $\Delta T$ of this specimen $A_5$ was 120° C. and above.

| Propylene glycol | 30 g |
|---|---|
| Ion-exchanged water | 65 g |
| C.I. Direct Blue 1 (C.I. No. 24410 - Direct Sky Blue 6B) | 5 g |
| Polyoxyethylene sorbitan monooleate | 0.1 g |

As a comparative specimen, the following components were mixed together to prepare a specimen $B_5$ in the same manner as in the specimen $A_5$. $\Delta T$ of this specimen $B_5$ was −5° C.

When the jet recording operation was conducted using these specimens $A_5$ and $B_5$ by means of the recording device same as in Example 1 above under the recording conditions I and II below, the results as shown in Tables 7 and 8 were obtained. (Evaluation of the image quality is same as in Table 2).

TABLE 7

Table 7

| Specimen | Time Lapse (Min.) | Evaluations of Image Quality | | | | |
|---|---|---|---|---|---|---|
| | | 1 | 5 | 30 | 100 | 180 |
| $A_5$ | | | | | | |
| $B_5$ | | | | Δ | x | — |

Recording Conditions-I: Applied voltage: 14 V, pulse width: 200 sec., applied frequency: 700 Hz

TABLE 8

Table 8

| Specimen | Time Lapse (Min.) | Evaluations of Image Quality | | | |
|---|---|---|---|---|---|
| | | 1 | 5 | 30 | 180 |
| $A_5$ | | | | | |
| $B_5$ | | | | Δ | x | — |

Recording Conditions-II: Applied voltage: 14 V, pulse width: 200 sec., applied frequency: 1.5 KHz As is apparent from Tables 7 and 8 above, while the specimen $A_5$ (the liquid recording medium according to the present invention) exhibits very favorable results, the specimen $B_5$ (comparative sample) lowers its recording characteristics after continuous recording over a long period of time; in particular, when the frequency is high (the recording condition II), the difference in the results from those of the specimen $A_5$ becomes considerable after lapse of long hours for the recording operation. In other words, the specimen $B_5$ lowered its stability with lapse of time, on account of which the quality of the recorded image gradually deteriorated, and, further, as the recording hours prolonged, there occurred stoppage in ejection of the liquid droplets. In contrast to this, the specimen $A_5$ could maintain its stability disregard of the time lapse, whereby the recorded image of very high quality could be resulted even after long hours continuous recording operation.

EXAMPLE 6

The following components were uniformly mixed to obtain yellow liquid recording medium.

| Vari-Fast Yellow #3105 (C.I. No. 18690 - C.I. Solvent Yellow 21) | 3 g |
|---|---|
| Isopropyl alcohol | 97 g |

Using this liquid recording medium, the jet recording was conducted continuously over a long period of time by means of the recording device same as in Example 1 above. As the result, evaluation of the recording image is as indicated in Table 9 below (The standard for image evaluation is as same as in Table 2.) ΔT was found to be 68° C. and above.

Table 9

| Evaluation of | Time Lapse (Min.) | | | |
|---|---|---|---|---|
| | 2 | 30 | 120 | 240 |

Table 9-continued

| | Time Lapse (Min.) | | | |
|---|---|---|---|---|
| | 2 | 30 | 120 | 240 |
| Image Quality | | | | |

EXAMPLE 7

Air was dissolved in the specimen $A_{21}$ in Example 2 above to its saturation point at 25° C., with which specimen the recording was conducted in the same manner as in Example 1 above. Fairly good image was obtained even after long hours' continuous recording operation. Remarkably excellent results were obtained in respect to its heat response, energy efficiency, and so forth, in particular.

What is claimed is:

1. Liquid recording medium for use in a recording method, in which the liquid recording medium is ejected from an orifice of a nozzle by the action of heat energy, and the thus ejected liquid recording medium is caused to impinge toward an image recording member in the form of droplets for image recording, said liquid recording medium comprising:

(a) recording agent which is a component to form a recorded image; and (b) carrier liquid to dissolve or disperse said recording agent, a difference ΔT between a decomposition temperature of a substance having the lowest decomposition temperature among the substances constituting the recording agent and a boiling point of said liquid recording medium, exclusive of said recording agent, being at least 30° C.

2. Liquid recording medium as set forth in claim 1, wherein said difference ΔT between the decomposition temperature of a substance having the lowest decomposition temperature among the substances constituting the recording agent and a boiling point of said liquid recording medium, exclusive of said recording agent, being 40° C. or higher.

3. Liquid recording medium as set forth in claim 1, wherein said difference ΔT between the decomposition temperature of a substance having the lowest decomposition temperature among the substances constituting the recording agent and a boiling point of said liquid recording medium, exclusive of said recording agent, being 50° C. or higher.

4. Liquid recording medium as set forth in claim 1, wherein said recording agent is selected from water-soluble dyestuffs.

5. Liquid recording medium as set forth in claim 1 or 4, wherein said carrier liquid is selected from the group consisting of water and a mixture of water and water-soluble solvent.

6. Liquid recording medium as set forth in claim 1, wherein said recording agent is selected from dyestuffs insoluble in water.

7. Liquid recording medium as set forth in claim 1 or 6, wherein said recording agent is selected from solvents insoluble in water.

8. Liquid recording medium as set forth in claim 1, wherein a gas is dissolved in said liquid recording medium at an ambient temperature when it is used, at a rate of 0.01 ml per 1 ml of said liquid recording medium as converted into conditions of 0° C. and 760 mm Hg.

9. Liquid recording medium as set forth in claim 8, wherein said gas dissolved in said liquid recording medium is an inactive gas.

10. Liquid recording medium as set forth in claim 8 or 9, wherein said gas dissolved in said liquid recording medium is selected from the group consisting of $N_2$, $O_2$, $CO_2$ or Ar gases.

11. Method for recording comprising: ejecting a liquid recording medium from the orifice of a nozzle, as droplets, by employing heat energy and thereafter, causing the ejected liquid to impinge on an image recording member, wherein the liquid recording medium comprises:
 (a) a recording agent which is a component for forming a recorded image; and
 (b) a carrier liquid to dissolve or disperse said recording agent, said carrier liquid optionally containing an additive, wherein the difference in the $\Delta T$ between the lowest decomposition temperature of the recording agent and the boiling point of the liquid recording medium, excluding the recording agent, is at least 30° C.

* * * * *

UNITED STATES PATENT AND TRADEMARK OFFICE
CERTIFICATE OF CORRECTION

PATENT NO. : 4,243,994
DATED : January 6, 1981
INVENTOR(S) : HAJIME KOBAYASHI, ET AL.

It is certified that error appears in the above-identified patent and that said Letters Patent are hereby corrected as shown below:

Column 4, line 30, "Ser. No." should read --No.--.

Column 7, line 25-26, "cyclohexane" should read --cyclohexanone--.

Column 8, line 27, "Black Dyes" should read --Basic Dyes--.

Column 8, line 56, after "(53630)" delete --7.--.

Column 8, line 57, before "Vat Dyes" insert --7.--.

Column 11, line 10, "PH" should read --pH--.

Column 14, line 12, "$10^2$" should read --$10^{-2}$--.

UNITED STATES PATENT AND TRADEMARK OFFICE
CERTIFICATE OF CORRECTION

PATENT NO. : 4,243,994

DATED : January 6, 1981

INVENTOR(S) : HAJIME KOBAYASHI, ET AL.

It is certified that error appears in the above-identified patent and that said Letters Patent are hereby corrected as shown below:

Column 17, lines 59-67, to, Column 18, lines 1-6, Table 2;

Table 2

| Time lapse (min.) | Evaluation of Image Quality | | | |
|---|---|---|---|---|
| | 1 | 5 | 30 | 180 |
| Specimen A₁ | | | | |
| Specimen B₁ | | △ | ＊ | — |

Standard of Evaluation

: Excellent
: Fair
△: Satellite dots observed to some extent, but not practically detrimental
×: Not practically usable
—: No image formation should read as follows:

Table 2

| Time lapse (min.) | Evaluation of Image Quality | | | |
|---|---|---|---|---|
| | 1 | 5 | 30 | 180 |
| Specimen $A_1$ | ◎ | ◎ | ◎ | ◎ |
| Specimen $B_1$ | ○ | △ | × | — |

Standard of Evaluation

◎ : Excellent
○ : Fair
△ : Satellite dots observed to some extent, but not practically detrimental
× : Not practically usable
— : No image formation

UNITED STATES PATENT AND TRADEMARK OFFICE
CERTIFICATE OF CORRECTION

PATENT NO. : 4,243,994

DATED : January 6, 1981

INVENTOR(S) : HAJIME KOBAYASHI, ET AL.

It is certified that error appears in the above-identified patent and that said Letters Patent are hereby corrected as shown below:

Column 18, lines 53-63, Table 3;

Table 3

| Specimen | Kind of Gas | Dissolved quantity*) ($\times 10^{-2}$ ml/ml) |
|---|---|---|
| $A_{11}$ | | 1.0 |
| $A_{12}$ | $N_2$ | 1.25 |
| $A_{13}$ | | 1.4 (saturated quantity) |
| $A_{14}$ | | 1.0 |
| $A_{15}$ | Air | 1.25 |
| $A_{16}$ | | 1.6 (saturated quantity) |
| $A_{17}$ | | 13.5 |
| $A_{18}$ | $CO_2$ | 30.0 |
| $A_{19}$ | | 72.0 (saturated quantity) | should read as follows:

Table 3

| Specimen | Kind of Gas | Dissolved quantity*) ($\times 10^{-2}$ ml/ml) |
|---|---|---|
| $A_{11}$ | | 1.0 |
| $A_{12}$ | $N_2$ | 1.25 |
| $A_{13}$ | | 1.4 (saturated quantity) |
| $A_{14}$ | | 1.0 |
| $A_{15}$ | Air | 1.25 |
| $A_{16}$ | | 1.6 (saturated quantity) |
| $A_{17}$ | | 13.5 |
| $A_{18}$ | $CO_2$ | 30.0 |
| $A_{19}$ | | 72.0 (saturated quantity) |

UNITED STATES PATENT AND TRADEMARK OFFICE
CERTIFICATE OF CORRECTION

PATENT NO. : 4,243,994

DATED : January 6, 1981

INVENTOR(S) : HAJIME KOBAYASHI, ET AL.

It is certified that error appears in the above-identified patent and that said Letters Patent are hereby corrected as shown below:

Column 19, lines 8-17, Table 4;

Table 4

| Speci-men | Mixing ratio (By Weight) | | | Evaluation of Image Quality Time Lapse (min.) | | | |
|---|---|---|---|---|---|---|---|
| | water | n-propyl alcohol | dyestuff | 1 | 120 | 300 | 420 |
| A21 | 85 | 10 | 5 | | | | |
| A22 | 60 | 35 | 5 | | | | |
| A23 | 35 | 60 | 5 | | | | |
| A24 | 10 | 85 | 5 | | | | | should read as follows:

Table 4

| Specimen | Mixing Ratio (By Weight) | | | Evaluation of Image Quality Time Lapse (min.) | | | |
|---|---|---|---|---|---|---|---|
| | Water | n-propyl alcohol | dyestuff | 1 | 120 | 300 | 420 |
| A21 | 85 | 10 | 5 | ◎ | ◎ | ◎ | ○ |
| A22 | 60 | 35 | 5 | ◎ | ◎ | ◎ | ◎ |
| A23 | 35 | 60 | 5 | ◎ | ◎ | ◎ | ◎ |
| A24 | 10 | 85 | 5 | ◎ | ◎ | ◎ | ○ |

UNITED STATES PATENT AND TRADEMARK OFFICE
CERTIFICATE OF CORRECTION

PATENT NO. : 4,243,994

DATED : January 6, 1981

INVENTOR(S) : HAJIME KOBAYASHI, ET AL.

It is certified that error appears in the above—identified patent and that said Letters Patent are hereby corrected as shown below:

Column 19, lines 42-55, Table 5;

Table 5

| Specimen | Carrier Liquid Additive | | $\Delta T$ | Evaluation of Image Quality Time Lapse (Min.) | | | |
|---|---|---|---|---|---|---|---|
| | | | | 2 | 120 | 300 | 420 |
| $A_{31}$ | Methanol | 92 g | 185°C or above | | | | |
| $A_{32}$ | Ethanol | 92 g | 172°C or above | | | | |
| $A_{33}$ | Ion-exchanged Water Glycerine | 47 g 45 g | 130°C or above | | | | |
| $A_{34}$ | Ion-exchanged Water Ethylene Glycol | 22 g 70 g | 100°C or above | | | | | should read as follows:

Table 5

| Specimen | Carrier Liquid Additive | | $\Delta T$ | Evaluation of Image Quality | | | |
|---|---|---|---|---|---|---|---|
| | | | | Time Lapse (Min.) | | | |
| | | | | 2 | 120 | 300 | 420 |
| $A_{11}$ | Methanol | 92 g | 185°C or above | ◉ | ◉ | ◉ | ◉ |
| $A_{12}$ | Ethanol | 92 g | 172°C or above | ◉ | ◉ | ◉ | ◉ |
| $A_{13}$ | Ion-exchanged Water Glycerine | 47 g 45 g | 130°C or above | ◉ | ◉ | ◉ | ○ |
| $A_{14}$ | Ion-exchanged Water Ethylene Glycol | 22 g 70 g | 100°C or above | ◉ | ◉ | ○ | ○ |

Column 20, lines 9-15, Table 6;

Table 6

| Specimen | $\Delta T$ | Evaluation of Image Quality Time Lapse (Min.) | | | |
|---|---|---|---|---|---|
| | | 2 | 10 | 60 | 180 |
| $A_4$ | 44°C or above | | | | |
| $B_4$ | −28°C or below | | △ | × | — | should read as follows:

Table 6

| Specimen | $\Delta T$ | Evaluation of Image Quality | | | |
|---|---|---|---|---|---|
| | | Time Lapse (Min.) | | | |
| | | 2 | 10 | 60 | 180 |
| $A_4$ | 44°C or above | ◉ | ◉ | ◉ | ○ |
| $B_4$ | −28°C or below | ○ | △ | × | — |

UNITED STATES PATENT AND TRADEMARK OFFICE
CERTIFICATE OF CORRECTION

PATENT NO. : 4,243,994

DATED : January 6, 1981

INVENTOR(S) : HAJIME KOBAYASHI, ET AL.

It is certified that error appears in the above-identified patent and that said Letters Patent are hereby corrected as shown below:

Column 20, line 16, after "Table 6" insert--(The standard of image evaluation is same as in Table 2)--.

Column 21, line 9, delete the phrase "TABLE 7", first occurrence.

Column 21, line 19, delete the phrase "TABLE 8", first occurrence.

Signed and Sealed this

Fifteenth Day of February 1983

[SEAL]

Attest:

GERALD J. MOSSINGHOFF

Attesting Officer

Commissioner of Patents and Trademarks